United States Patent [19]

Cover

[11] 4,396,810
[45] Aug. 2, 1983

[54] PUSHBUTTON TELEPHONE DIAL LOCKS

[76] Inventor: Hunter H. Cover, 6661 Wilbur Ave., #25, Reseda, Calif. 91335

[21] Appl. No.: 274,016

[22] Filed: Jun. 15, 1981

Related U.S. Application Data

[63] Continuation-in-part of Ser. No. 99,469, Dec. 3, 1979, abandoned.

[51] Int. Cl.³ .............................................. H04M 1/66
[52] U.S. Cl. .......................... 179/189 D; 70/DIG. 72
[58] Field of Search ............ 179/189 D; 70/DIG. 72, 70/95, 158, 159, 160, 163

[56] References Cited

U.S. PATENT DOCUMENTS

| | | | |
|---|---|---|---|
| 2,194,521 | 3/1940 | Engelson | 179/189 D |
| 3,866,000 | 2/1975 | Gillis | 179/189 D |
| 3,899,647 | 8/1975 | Nachsi et al. | 179/189 D |
| 3,965,310 | 6/1976 | Willy | 179/189 D |
| 4,005,279 | 1/1977 | Richter | 179/189 D |
| 4,204,097 | 5/1980 | Schmit | 179/189 D |

FOREIGN PATENT DOCUMENTS

| | | | |
|---|---|---|---|
| 220684 | 4/1962 | Austria | 179/189 D |
| 2916630 | 11/1980 | Fed. Rep. of Germany | 179/189 D |
| 2919599 | 11/1980 | Fed. Rep. of Germany | 179/189 D |

Primary Examiner—George G. Stellar

[57] ABSTRACT

A keyboard lock mechanism is disclosed herein for preventing all or some of the keys or pushbuttons on a telephone from being depressed which includes a mounting plate attached detachably or permanently to the body or case of the telephone and having a central opening therein exposing the full keyboard of keys normally carried on the telephone body. A movable cover is pivotally or slidably carried on the mounting plate for selective positioning over the keys of the keyboard so that the keys are inaccessible. A lock having a movable latch releasably secures the cover over the keys or pushbuttons. Attachments are provided on the mounting plate for securing the mechanism onto the telephone body.

4 Claims, 10 Drawing Figures

PUSHBUTTON TELEPHONE DIAL LOCKS

BRIEF SUMMARY OF THE INVENTION

The present invention provides a novel keyboard lock mechanism adapted to be mounted onto the body of a telephone so that the keys or buttons on the keyboard of a telephone may be prevented from being depressed. The mechanism includes a mounting plate carried on the telephone body or case and wherein the plate includes a central opening surrounded by an edge marginal region of the plate. The central opening is in registry with the full keyboard of keys or buttons normally carried by the telephone body. A movable cover means is carried on the plate adjacent the central opening for selective positioning over the keys of the keyboard so that the keys are inaccessible. A lock means is provided for releasably securing the cover to the plate. Attachment means is provided for securing the mounting plate onto the telephone body.

In one form of the invention, the mounting plate is detachably mounted onto the telephone, while in another it is permanently so mounted. Further, in one version the cover is pivotally carried on the plate, while in another the cover is slidably carried thereon. The cover may be solid and in the locked position make the entire keyboard inaccessible, or it may have individual pushbutton access openings, any of which may be plugged, as desired, for partial access to the keyboard.

Therefore, it is among the primary objects of the present invention to provide a novel telephone accessory having means for blocking access to the pushbutton keyboard on a telephone to prevent outgoing phone calls while permitting incoming phone calls to be received.

Another object of the present invention is to provide a novel telephone accessory including a keyboard lock mechanism for selectively covering and uncovering the individual pushbuttons or keys of a keyboard, for instance, to make only certain combinations of pushbuttons accessible.

Another object of the present invention is to provide a novel lock mechanism for a keyboard which is light weight, typically made of sheet metal or durable plastic, is relatively inexpensive to manufacture and which may be readily installed by an unskilled person.

Still another object of the present invention is to provide a novel telephone accessory which is decorative and does not detract from the appearance of the telephone, and which provides areas for carrying advertising or messages.

Still another object of the present invention is to provide a telephone keyboard lock mechanism which utilizes existing inexpensive locks of the type used to lock dial-type telephones, and wherein in the unlocked position the mechanism conveniently folds out of the way and does not interfere with the normal use of the telephone.

BACKGROUND OF THE INVENTION

1. Field of the Invention

The subject invention relates to telephone accessories and, more particularly, to a novel telephone accessory incorporating a keyboard lock mechanism adapted to prevent operation of keys on a pushbutton keyboard.

2. Brief Description of the Prior Art

In the past, a variety of lock mechanisms have been provided for use in connection with rotary telephone dials for prohibiting unauthorized use of the telephone. One such device fully occupies one or more of the finger holes in the rotary dial and strikes against the finger stop as the dial is rotated to prevent further rotation of the dial. Also, other devices have been provided which operate solely on the dial while permitting the handset to be raised from the telephone cradle in the event an incoming call is received. Therefore, normal operation of the telephone is not inhibited except for the procedure of dialing out.

However, with the advent of pushbutton keyboards, no moving parts are involved such as the rotary dial employed so that lock mechanisms attended thereto cannot be used with the pushbutton keyboard. It is still desirable to permit the handset to be raised from the cradle to receive incoming calls while at the same time preventing outgoing calls.

Therefore, a longstanding need has existed to provide a lock mechanism for a pushbutton keyboard which will prevent depression of the keys or buttons but which will permit full operation of the handset such as for answering incoming calls.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

DESCRIPTION OF PREFERRED EMBODIMENTS

Figure 1:
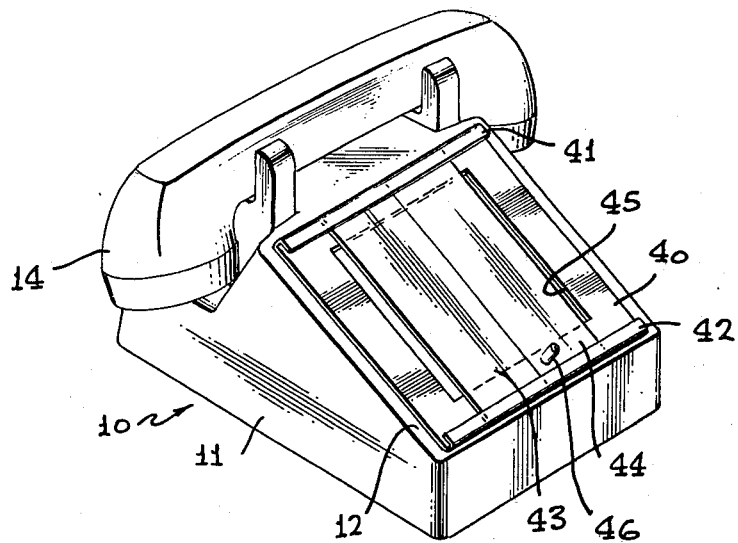
FIG. 1 is a front perspective view of a telephone incorporating the novel keyboard lock mechanism of the present invention.
Figure 2:
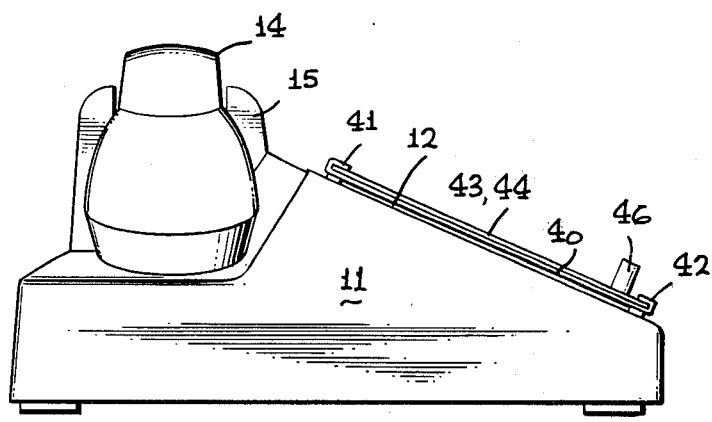
FIG. 2 is a side elevational view thereof.

Referring to FIGS. 1 and 2, a conventional telephone is illustrated in the general direction of arrow 10 which includes a box-like body 11 having a sloping face 12 which is provided with a plurality of keys or pushbuttons arranged in a keyboard illustrated in broken lines.

Figure 7:
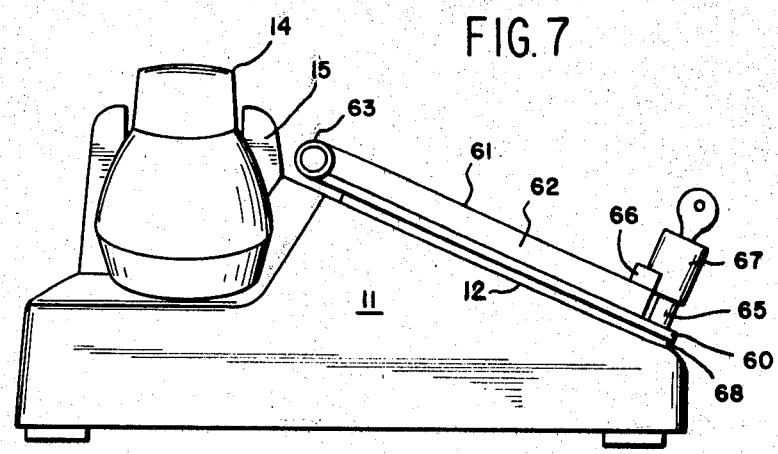
FIG. 7 is another side elevational view showing a specific method of attachment of the mechanism to the telephone.

In general, the keyboard is represented by numeral 13. The conventional telephone 10 further includes a handset 14 which is illustrated at its rest position on a cradle represented by arms 15 and 16. Arms 15 and 16 are illustrated in front of the handset 14 while similar and identical arms are located at the rear of the handset as well. A plate 40 is secured to the telephone at its corners by any suitable means. The plate 40 includes an upper folded over portion 41 and a lower folded over portion 42. In this manner, a pair of tracks are provided in which a pair of closure members 43 and 44 are movably provided. The movable members slide within the tracks 41 and 42 to the opposite sides of the telephone whereby the keys and pushbuttons of the keyboard are exposed through a central opening 45 in the plate 40. The closure members 43 and 44 in the "exposed keyboard" position conveniently do not project beyond the telephone 11 which may be operated normally. As illustrated, the closure members or covers 43 and 44 are in an adjacent or central position over the opening 45 so that the keys of the keyboard are hidden and not accessible for use. A lock 46 is provided for securing the closure members or covers 43 and 44 in the closed or adjacent position. The adjacent side marginal regions of the plate 40 may be used for carrying advertising, slogans, or other messages. One specific way of attaching plate 40 to face 12 of the telephone is by means of a flexible strip 68 having permanent-setting adhesive on both its surfaces as indicated in FIG. 7 for another keyboard lock mechanism embodiment.

Figure 3:
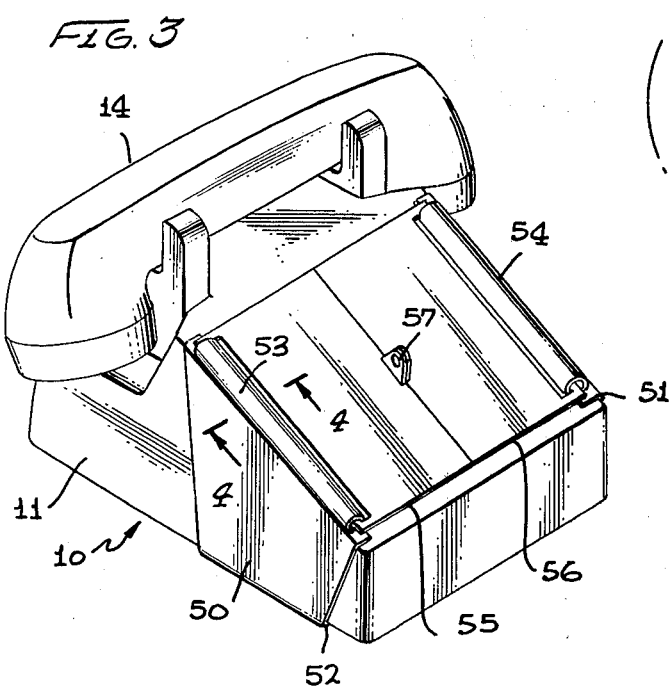
FIG. 3 is a front perspective view of another version of the keyboard lock mechanism mounted on a telephone.
Figure 4:
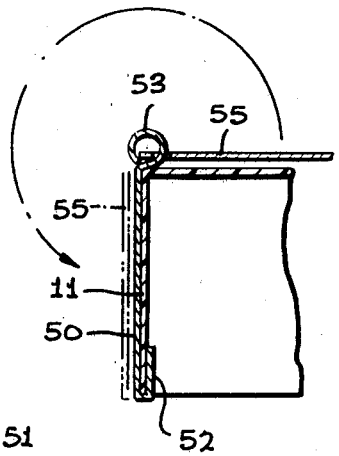
FIG. 4 is an enlarged fragmentary view of the corner of the keyboard lock mechanism shown in the direction of arrows 4—4 of FIG. 3.

Referring to FIGS. 3 and 4, another embodiment of the present invention is illustrated wherein a pair of side members 50 and 51 extend down the sides of the telephone 10 and underneath the lower edge thereof by folded over portions or catches 52. The opposite end of the side strips or members 50 and 51 terminate in a hinge 53 associated with side strip 50 and hinge 54 associated with side strip 51. The hinges 53 and 54 are employed for permitting rotation or movement of a pair of cover plates or members 55 and 56 which when rotated towards each other as shown in FIG. 3, completely cover the keyboard underneath. The adjacent edges of each cover plate or member 55 and 56 include a hasp 57 having a hole or aperture therein through which a lock may be disposed for maintaining the covers in position. A central opening is defined between the opposing edges of the side members 50 and 51 through which the keys and pushbuttons of the keyboard are exposed when the cover members or plates 55 and 56 are rotated outwardly as shown in the direction of the arrow on FIG. 4, coming to rest in their extreme outward position in a vertical plane adjacent to side plates 50 and 51, respectively. In this convenient folded position the cover plates 55 and 56 do not project beyond the telephone 11 which may be operated normally.

Figure 5:
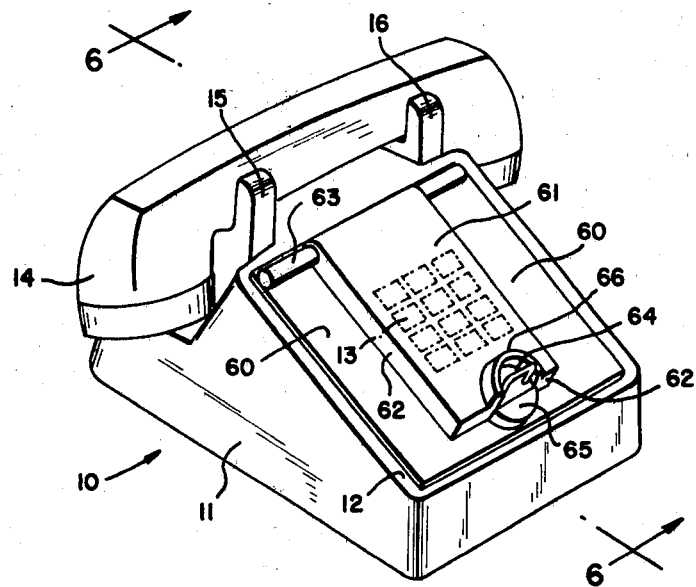
FIG. 5 is a front perspective view of still another version of the keyboard lock mechanism.

Referring to FIG. 5, yet another embodiment of the present invention is illustrated wherein the plate 60 having a central opening identical to the central opening 45 in FIG. 1 is secured to the sloping face 12 of the case body 11 by any suitable means and includes a hinge 63 along its top edge and a staple 64 along and rising from the bottom edge of its central opening in a direction perpendicular to the plate 60. The cover plate 61 is rotatably attached at its top edge to hinge 63, includes flanges 62 on all non-hinged edges to prevent access to the pushbutton keyboard, and further includes along its bottom edge a lock support 65 and a lock guide 66 separated by an elongated opening which in the locked position accepts the staple 64, as shown in FIG. 5. The side marginal regions of plate 60 may be used for carrying advertising slogans or other messages.

Figure 6:
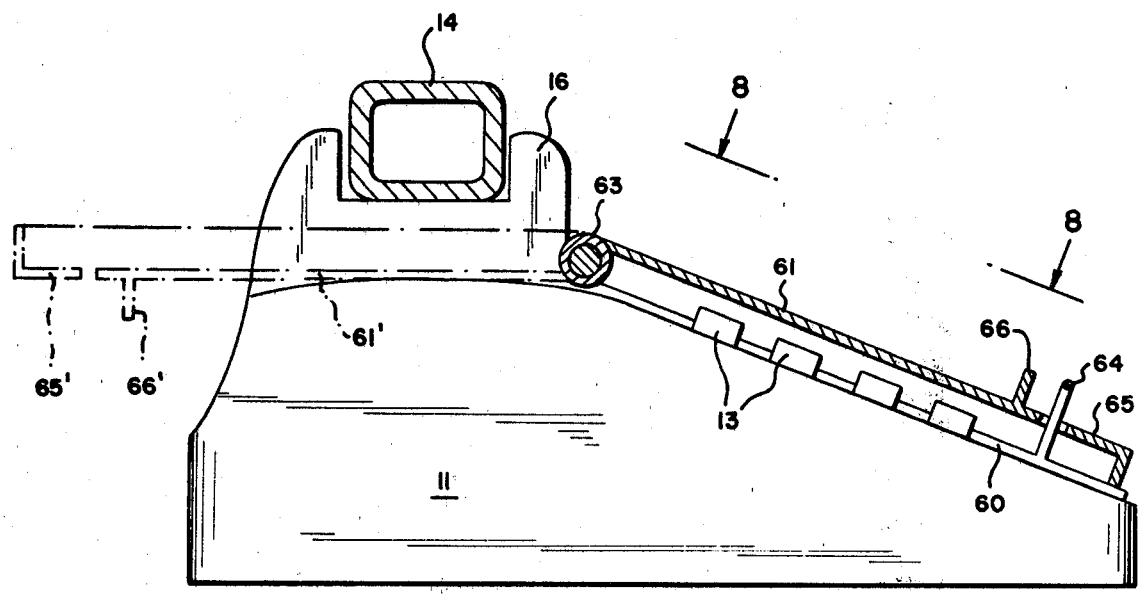
FIG. 6 is a side elevational cross-section of the version shown in FIG. 5.

Referring to FIG. 6 which is an elevational central cross-section of the device shown in FIG. 5, the disposition of staple 64, lock support 65 and lock guide 66 in the locked position is clearly discernable. Also shown in FIG. 6 is the unlocked position of cover plate 61 which is completely folded out of the way by rotation about hinge 63 in the direction away from the pushbutton keyboard, coming to rest against case body 11 under handset 14 with elements 61, 65, and 66 now in locations 61', 65' and 66', respectively. With this arrangement the telephone may be operated in the normal manner.

Referring to FIG. 7, a side elevation of the device of FIG. 5, the locked position with lock 67 in place is shown. Lock 67 may be the cylindrical tumbler lock well-known for locking rotary telephone dials. Also shown is a specific method of mounting plate 60 to face 12 of case body 11 by means of a flexible strip 68 having permanent-setting adhesive on both its surfaces.

Figure 8:
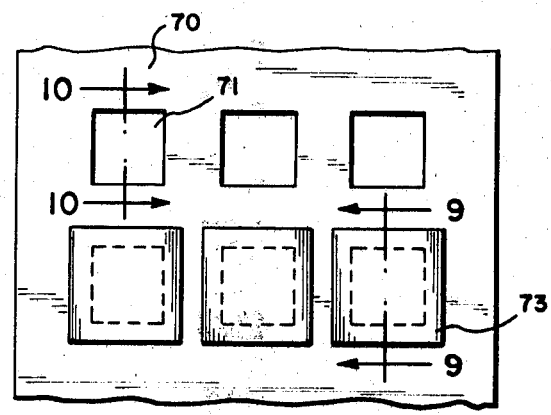
FIG. 8 is an enlarged fragmentary view of a portion of the mechanism in the direction of arrows 8—8 of FIG. 6 showing a configuration of partial access to the telephone keyboard.
Figure 10:
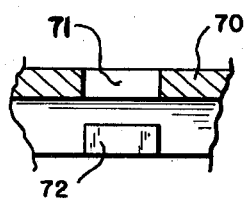
FIG. 10 is a cross-sectional view in the direction of arrows 10—10 of FIG. 8 showing an accessible portion of the partial access configuration.
Figure 9:
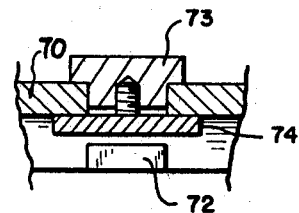
FIG. 9 is a cross-sectional view in the direction of the arrows 9—9 of FIG. 8 showing an inaccessible portion of the partial access configuration.

Referring to FIGS. 8, 9 and 10, a partial access configuration is illustrated wherein each individual pushbutton may be selectively rendered accessible or inaccessible as desired. Cover plate 70 comprises access openings 71 located directly over all individual pushbuttons 72. Individual plugs 73 contoured to closely fit the access openings 71 may be inserted and locked in place from the underside of plate 70 by a fastening means 74 such as a knurled screw. When the cover is locked on to the telephone, as shown in FIG. 7, the fastening means 74 is not accessible and the plugs 73 cannot be removed. FIG. 9 shows a pushbutton made inaccessible by a lockably inserted plug 73, and FIG. 10 shows an accessible pushbutton without a plug. Even though FIG. 8 shows a row of three accessible pushbuttons adjacent to a row of three inaccessible pushbuttons, it is to be understood that the plugs 73 may be lockably inserted or not above any pushbutton in a completely arbitrary manner.

In view of the foregoing, it can be seen that the three versions of the present invention provide a telephone accessory which prevents access to the pushbuttons or keys of the keyboard for making unauthorized telephone calls. In one configuration any or all pushbuttons may be made inaccessible. However, in all cases the handset 14 is readily available for use for receiving incoming calls and in no way does the device impede such operation or procedure. Ample surfaces are available on the plates and covers for advertising or message purposes and the device may be readily installed or assembled on a conventional telephone with ease and without technical skill. Locking means of several designs may be included.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A keyboard lock mechanism for a telephone having a handset and pushbutton keys normally exposed through a case body comprising the combination of:

a mounting plate attached to the case body having a central opening therein passing the pushbuttons therethrough, and further having upper and lower track guides;

a flexible strip having permanent-setting adhesive on both its surfaces to attach said mounting plate to said case body;

cover means movably carried on said mounting plate for selectively rendering the pushbuttons inaccessible, said cover means comprising a pair of plates slidably carried between said upper and lower track guides of said mounting plate; and lock means to releasably secure said cover means over the pushbuttons.

2. A keyboard lock mechanism for a telephone having a handset and pushbutton keys normally exposed through a case body comprising the combination of:

a mounting plate attached to the case body having a central opening therein passing the pushbuttons therethrough, said mounting plate comprising a horizontal hinge along its top edge and a staple perpendicular to the plane of the mounting plate rising from the bottom edge of said central opening;

cover means movably carried on said mounting plate for selectively rendering the pushbuttons inaccessible, said cover means comprising a plate rotatably attached at its top edge to said horizontal hinge and having flanges extending downward from its non-hinged edges to prevent access to said pushbuttons, said cover means further having a lock guide and lock support integral with its bottom edge so as to accept said staple in the locked position, and in the unlocked position rotatably completely folded out of the way under said handset; and lock means to releasably secure said cover means over the pushbuttons, said lock means comprising a cylindrical tumbler lock well known for locking rotary telephone dials.

3. The invention as defined in claim 2 wherein:

said cover plate comprises individual access openings located above all pushbuttons and further comprises individual plugs lockably insertable into said individual access openings to close off any desired said access openings to render inaccessible only those pushbuttons underneath said inserted individual plugs.

4. The invention as defined in claim 2 including:

a flexible strip having permanent-setting adhesive on both its surfaces to attach said mounting plate to said case body.

* * * * *